(12) United States Patent
Kamble et al.

(10) Patent No.: US 11,897,752 B2
(45) Date of Patent: Feb. 13, 2024

(54) TOUCHLESS FOOT PADDLE OPERATED DISPENSERS

(71) Applicant: PepsiCo, Inc., Purchase, NY (US)

(72) Inventors: Rahul Sadashiv Kamble, Faridabad (IN); Amandeep Singh Gulati, New Delhi (IN); Vipin Arora, New Delhi (IN)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/545,811

(22) Filed: Dec. 8, 2021

(65) Prior Publication Data

US 2022/0194773 A1   Jun. 23, 2022

(30) Foreign Application Priority Data

Dec. 19, 2020   (IN) .............................. 202041055346

(51) Int. Cl.
*B67D 1/14*   (2006.01)
*F16K 31/46*   (2006.01)

(52) U.S. Cl.
CPC ............ *B67D 1/1405* (2013.01); *F16K 31/46* (2013.01); *B67D 2001/1483* (2013.01)

(58) Field of Classification Search
CPC .......... B67D 3/04; B67D 3/0058; B67D 1/12; B67D 1/1277; B67D 1/1466; B67D 1/1405; B67D 2001/1483; F16K 31/46
See application file for complete search history.

(56) References Cited

U.S. PATENT DOCUMENTS

| | | | | |
|---|---|---|---|---|
| 2,293,073 A | * | 8/1942 | Osborne | G07F 13/10 194/297 |
| 2,307,589 A | * | 1/1943 | Johnson | G07F 13/065 221/96 |
| 2,512,961 A | * | 6/1950 | Morrison | F25D 31/002 62/331 |
| 2,799,623 A | | 7/1957 | Leas | |
| 3,141,573 A | | 7/1964 | Patch et al. | |
| 3,380,629 A | * | 4/1968 | Kontra | B67D 1/1466 222/26 |
| 4,738,285 A | | 4/1988 | Belland | |
| 4,751,943 A | * | 6/1988 | Chi | F16K 27/02 251/288 |

(Continued)

FOREIGN PATENT DOCUMENTS

GB   769196 B4   2/1957

OTHER PUBLICATIONS

International Search Report issued in International Application No. PCT/US2021/062430, dated Apr. 6, 2022, 4 pages.

(Continued)

*Primary Examiner* — Vishal Pancholi
*Assistant Examiner* — Robert K Nichols, II
(74) *Attorney, Agent, or Firm* — Sterne, Kessler, Goldstein & Fox P.L.L.C.

(57) ABSTRACT

A dispenser having a pedal actuator. The dispenser includes a valve operatively connected to a nozzle and which moves from a closed position to an open position to dispense an item, a first actuator operatively connected to the nozzle, and a second actuator located below the first actuator and operatively connected to the nozzle. The dispenser can be electro-mechanical and can include components capable of retrofitting onto existing dispensers.

20 Claims, 10 Drawing Sheets

(56) References Cited

U.S. PATENT DOCUMENTS

| | | | | |
|---|---|---|---|---|
| 5,307,837 | A | * | 5/1994 | Woltz .................... F16K 31/088 |
| | | | | 251/294 |
| 5,400,614 | A | * | 3/1995 | Feola ..................... A23G 9/228 |
| | | | | 62/135 |
| 5,957,040 | A | * | 9/1999 | Feola ..................... A23G 9/163 |
| | | | | 426/282 |
| 11,370,650 | B2 | * | 6/2022 | Currie .................. B67D 3/0058 |
| 2004/0021018 | A1 | | 2/2004 | Rupp |
| 2019/0084820 | A1 | | 3/2019 | Novelle et al. |
| 2022/0043075 | A1 | | 2/2022 | Weichel et al. |

OTHER PUBLICATIONS

Written Opinion of the International Searching Authority issued in International Application No. PCT/US2021/062430, dated Apr. 6, 2022, 5 pages.

* cited by examiner

TOUCHLESS FOOT PADDLE OPERATED DISPENSERS

CROSS-REFERENCE TO RELATED APPLICATIONS

This application claims priority to Indian Application No. 202041055346, filed Dec. 19, 2020, which is incorporated herein by reference in its entirety.

BACKGROUND

Field of the Invention

Embodiments described herein generally relate to systems and methods for filling containers. Specifically, embodiments described herein relate to a touchless dispenser that includes a pedal actuator operatively connected to an actuator of the dispensing valve.

Background

Filling stations for various items such as food and beverages, can be found in many places, including restaurants and movie theaters. Offices and workplaces can have filling stations as well. Users can be required to touch a filling station at many points to dispense an item. For example, an item can dispense while a user presses a button. Further, users can select or provide authorization to dispense an item by pressing buttons for payment or identification.

BRIEF SUMMARY OF THE INVENTION

Some embodiments relate to a dispenser that includes a housing and a nozzle arranged on the housing for dispensing an item. The dispenser further includes a valve operatively connected to the nozzle and configured to move from a closed position to an open position to dispense the item, a first actuator operatively connected to the nozzle and arranged on the housing below the nozzle, wherein the first actuator is depressed from a first position to a second position to dispense the item, a platform arranged on the housing and located below the first actuator, and a second actuator operatively connected to the nozzle and arranged on the housing below the platform, wherein the second actuator is depressed from a first position to a second position to dispense the item.

In any of the various embodiments discussed herein, the valve can include at least one of a mechanical actuation and an electrical actuation.

In any of the various embodiments discussed herein, the second actuator can be configured to be depressed by a foot action and comprises at least one of a pedal and a button.

In any of the various embodiments discussed herein, the nozzle can dispense the item while at least one of the first actuator and the second actuator is depressed.

In any of the various embodiments discussed herein, the nozzle can dispense the item for a predetermined period of time.

In any of the various embodiments discussed herein, the nozzle can dispense the item after the item is selected or dispensing is authorized.

In any of the various embodiments discussed herein, the dispenser can be touchless.

In any of the various embodiments discussed herein, the dispenser can be configured to retrofit onto an existing dispenser.

Some embodiments relate to a dispensing system that includes a dispenser that includes a housing and a nozzle operatively connected to a valve of the dispenser and arranged on the housing for dispensing an item. The dispensing system further includes a valve actuator configured to open the valve for dispensing the item, a mechanical actuator operatively connected to the valve actuator, and a first dispensing actuator operatively connected to the valve actuator and arranged on the housing below the nozzle, the first dispensing actuator comprising a pedal configured to be actuated by a foot action, wherein the dispensing actuator is depressed from a first position to a second position to dispense the item.

In any of the various embodiments discussed herein, the dispensing system can further include a control unit. In some embodiments, the first dispensing actuator can be configured to send an electrical signal to the control unit. In some embodiments, the control unit can be configured to send an electrical signal to the valve actuator to open the valve.

In any of the various embodiments discussed herein, the first dispensing actuator can be operatively connected to the mechanical actuator.

In any of the various embodiments discussed herein, the first dispensing actuator can be biased toward the first position.

In any of the various embodiments discussed herein, the first dispensing actuator can be biased toward the first position.

In any of the various embodiments discussed herein, the dispensing system can further include a second dispensing actuator operatively connected to the valve actuator and arranged on the housing above the first dispensing actuator. In some embodiments, the second dispensing actuator can include at least one of a button and a lever.

In any of the various embodiments discussed herein, the second dispensing actuator can be operatively connected to the mechanical actuator.

In any of the various embodiments discussed herein, the dispensing system can further include a second dispenser for dispensing an accessory of the item, the accessory comprising at least one of a straw, a lid, and a container sleeve, and a second dispensing actuator operatively connected to the second dispenser comprising a pedal configured to be actuated by a foot action. In some embodiments, the second dispensing actuator can be depressed from a first position to a second position to dispense the accessory.

Some embodiments relate to a method of dispensing an item with a dispenser that includes depressing a first actuator comprising a pedal configured to be actuated by a foot action from a first position to a second position, opening a valve of operatively connected to a nozzle of the dispenser in response to depressing the first actuator, and dispensing an item by the nozzle.

In any of the various embodiments discussed herein, a method of dispensing an item with a dispenser can further include depressing a second actuator located above the first actuator from a first position to a second position. In some embodiments, opening the valve can include depressing at least one of the first actuator and the second actuator.

In any of the various embodiments discussed herein, a method of dispensing the item with a dispenser can further include exerting a force to depress the second actuator, and exerting a force to depress the first actuator that is lower than the force to depress the second actuator.

In any of the various embodiments discussed herein, a method of dispensing an item with a dispenser can further include selecting the item for dispensing, and authorizing dispensing by confirming at least one of identity and payment.

BRIEF DESCRIPTION OF THE DRAWINGS/FIGURES

The accompanying drawings, which are incorporated herein and form part of the specification, illustrate the present invention and, together with the description, further serve to explain the principles thereof and to enable a person skilled in the pertinent art to make and use the same.

DETAILED DESCRIPTION OF THE INVENTION

Figure 1:
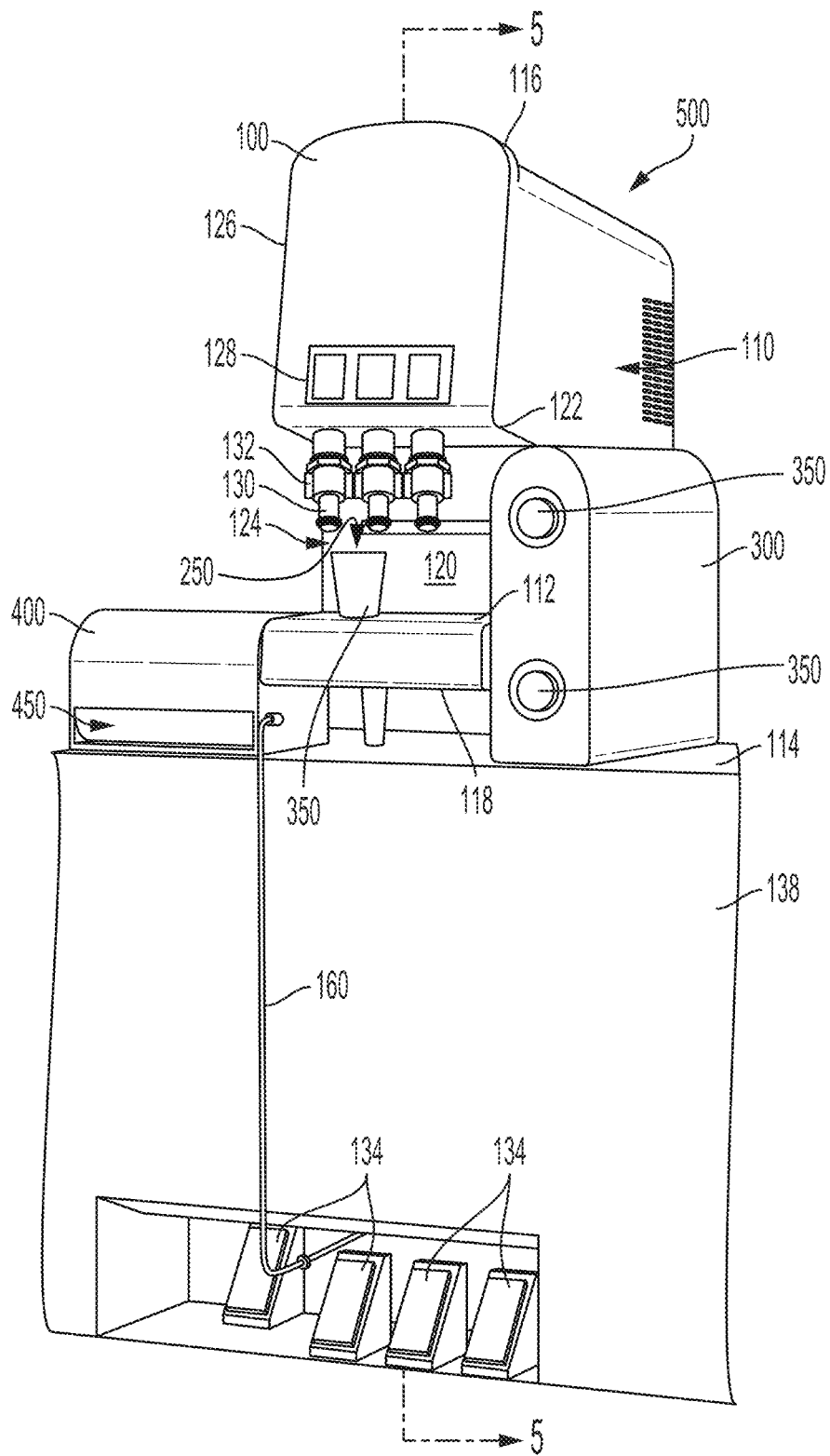
FIG. 1 is a perspective view of a dispensing system according to embodiments.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiments, it is submitted that it is within the knowledge of one skilled in the art to affect such feature, structure, or characteristic in connection with other embodiments whether or not explicitly described.

Filling stations can dispense a variety of items, including food and beverages. In some cases, filling stations can dispense beverages of different flavors or temperatures. Further, filling stations for food can dispense different flavors for the food. Filling stations for such items can be found at various locations, including but not limited to public restaurants, grocery stores, movie theaters, airports, sports entertainment venues, schools, pools, offices, and workplaces. While filling stations are convenient for users to customize their food or beverage by amount, flavor, and/or temperature, many publicly located filling stations can be accessed by multiple users and can require them to touch a filling station at numerous points. For example, to fill a container with an item, a user can be required to press a button. In some cases, the container can be filled while the button is pressed. Further, the filling station can require authorization to dispense an item by pressing buttons to provide payment and/or identification.

Public places and/or fixtures such as filling stations that are accessed by many people can accumulate germs. Germs can be spread from surfaces and can contribute to the spread of infectious diseases. The spread of germs can contribute to the impact of viruses and can be a significant public health concern. However, it can be challenging to maintain the cleanliness of public places and/or fixtures to prevent contamination. Further, certain fixtures, such as filling stations, can be cleaned only after multiple uses. To minimize contamination and improve the overall safety, health, and well-being of living beings, public places and/or fixtures can be designed to be more hygienic.

Embodiments described herein relate to a dispenser that includes touchless actuation.

Touchless systems can help to minimize contamination on surfaces and the spread of infectious diseases. In some embodiments, a dispenser can be actuated by a user action on a lever, for example. A user can push a container into the lever to depress it and dispense an item. A user action on a pedal can also actuate the dispenser. The pedal can be located below the lever and can be actuated by a user's foot. In some embodiments, the pedal can operatively connect to a valve of the dispenser electrically and/or mechanically. Actuating the pedal can actuate the valve directly and/or actuate a valve actuator operatively connected to the valve. In some embodiments, actuating the pedal can operatively push a button on the dispenser with a mechanical actuator overhanging about the dispenser.

The pedal actuator can be retrofit onto existing dispensers, such as by adding the valve actuator and/or mechanical actuator, with minimal effort. In some embodiments, pedal actuation can require less force to initiate or maintain a dispensing operation than lever actuation, which can provide greater accessibility. Pedal actuation can also be added to dispensers for containers and/or accessories to food or beverage items and/or containers, such as nutrition items, sweeteners, salt, straws, lids, sleeves, and/or napkins.

In some embodiments described herein, as shown, for example, in FIG. 1, a dispensing system 500 can include a dispenser 100 for dispensing an item 250. Item 250 can include a food, a beverage, and/or an ingredient for a food and/or a beverage. In some embodiments, dispensing system 500 can include a container dispenser 300 for dispensing a container 350 and/or an accessory dispenser 400 for dispensing an accessory 450. Accessory 450 can be used with item 250 and/or container 350.

The combination and/or capabilities of dispenser 100, accessory dispenser 400, and container dispenser 300 can depend on the application of dispensing system 500. For example, a retail environment, such as a restaurant or a movie theater, can require authorization for dispensing (e.g., payment and/or identification). Accordingly, these environments can provide additional options for users such that dispensing system 500 can include dispenser 100, container dispenser 300, and accessory dispenser 400. Multiple options can be provided to an authorized user so the user can customize their food and/or beverage to optimize their retail experience. In contrast, a dispensing system 500 in, for example, public locations without authorization requirements (e.g., parks, shopping centers, etc.), can provide only necessities. For example, dispensing system 500 can include dispenser 100 (e.g., a water fountain) that can provide water and/or carbonated water. Dispensing system 500 can operate similarly in office and/or school environments. In other office and/or school environments, dispensing system 500 can have additional capabilities. For example, dispensing system 500 can include dispenser 100, container dispenser 300, and accessory dispenser 400 to provide a user with necessities and, additionally, common items, such as hot water, tea, coffee, sugar, salt, and/or cups for hot and cold beverages.

Dispensing system 500 can include a housing 110. Dispenser 100, container dispenser 300, and accessory dispenser 400 can be stand-alone devices or positioned on a surface of housing 110. For example, in some embodiments, housing 110 can include a body 138 that can include a platform 114 on which dispenser 100, container dispenser 300, and accessory dispenser 400 are positioned. Platform 114 can be, for example, a tabletop, a countertop, or other support surfaces.

In some embodiments, dispensing system 500 can include a plurality of touchless (i.e., no contact) actuators associated with dispenser 100, accessory dispenser 400, and/or container dispenser 300, e.g., pedal actuator 134 and/or lever actuator 132.

Dispenser 100 can include one or more pedal actuators 134 that can be actuated to dispense each item 250. Pedal actuator 134 can be a lever or a button controlled with a user's foot and can be located on housing 110 below platform 114. In some embodiments, pedal actuator 134 can extend outwardly from housing 110. Pedal actuator 134 can allow a user to dispense a specific item 250 without having to touch dispensing system 500. Instead, the user can dispense item 250 by contacting pedal actuator 134 with their shoe and/or another device (e.g., a crutch or a cane).

In some embodiments, one or more lever actuators 132 can also allow the user to dispense each item 250 without having to touch dispensing system 500. Lever actuator 132 can be located on housing 110 above platform 114. Container 350 can be pushed into lever actuator 132 to dispense a specific item 250. In some embodiments, pedal actuator 134 can be actuated by a force that is less than the force required to actuate lever actuator 132.

The touchless actuation provided by lever actuator 132 and/or pedal actuator 134 can promote the user's health and well-being. Since surfaces can accumulate germs, touchless actuation can prevent the transfer of harmful germs to the user. Further, pedal actuator 134 can increase accessibility to dispensing system 500 by enabling actuation from a lower position on housing 110. In some embodiments, pedal actuator 134 can be actuated with less force than can be required by lever actuator 132, which can be helpful to users with, for example, physical and/or motor impairments. Further, pedal actuator 134 can be retrofit onto existing dispensing systems 500. Actuation can be mechanical and/or electrical.

In some embodiments, housing 110 can store supplies for item 250 and one or more conduits for supplying item 250 in, e.g., body 138. For example, housing 110 can store food items 250 (e.g., oatmeal or popcorn) and/or beverage items 250 (e.g., soda, tea, coffee, juice, or lemonade). Further, housing 110 can store ingredient items 250 (e.g., nutrition items, flavors, salt, sugar, or water) to produce food and/or beverages. In some embodiments, housing 110 can store containers 350 for foods, hot beverages, and/or cold beverages. In some embodiments, housing 110 can store accessories 450, which can include, for example, salt, sugar, cinnamon, nutmeg, straws, lids (e.g., lids for hot beverages or lids for cold beverages), sleeves, and/or napkins. Dispensing of each item 250, container 350, and/or accessory 450 can be actuated by a distinct lever actuator 132 and/or pedal actuator 134. In other embodiments, one or more common lever actuators 132 and/or pedal actuators 134 can dispense one or more of item 250, container 350, and/or accessory 450. In these embodiments, a user can make a selection for dispensing, e.g., a touchless selection via voice command, mobile device, gesture, etc.

In some embodiments, housing 110 can include a platform 112, an upper end 116, a lower end 118, a front surface 120, an overhang 122, and/or a receiving area 124 for dispenser 100. Housing can include one or more nozzles 130 for dispensing an item 250 positioned at upper end 116.

Container 350 can be placed in receiving area 124, which can be an area under nozzles 130 that can be positioned on overhang 122. Container 350 can be placed directly under nozzle 130 that can dispense to the desired item 250. In some embodiments, housing 110 can include platform 112 (e.g., a drip tray) at lower end 118 on which container 350 can be positioned within receiving area 124. In this embodiment, receiving area 124 can be the area between overhang 122 and platform 112. Platform 112 can be located on housing below lever actuator 132 and above pedal actuator 134. In some embodiments, container 350 can be provided by container dispenser 300. Alternatively, a user can provide container 350, such as a reusable container (e.g., a water bottle).

In some embodiments, housing 110 for dispenser 100 can include a display 126 for indicating item 250 dispensed by each nozzle 130. A user interface 128 can receive a selection for an item 250 to be dispensed.

Figure 2:
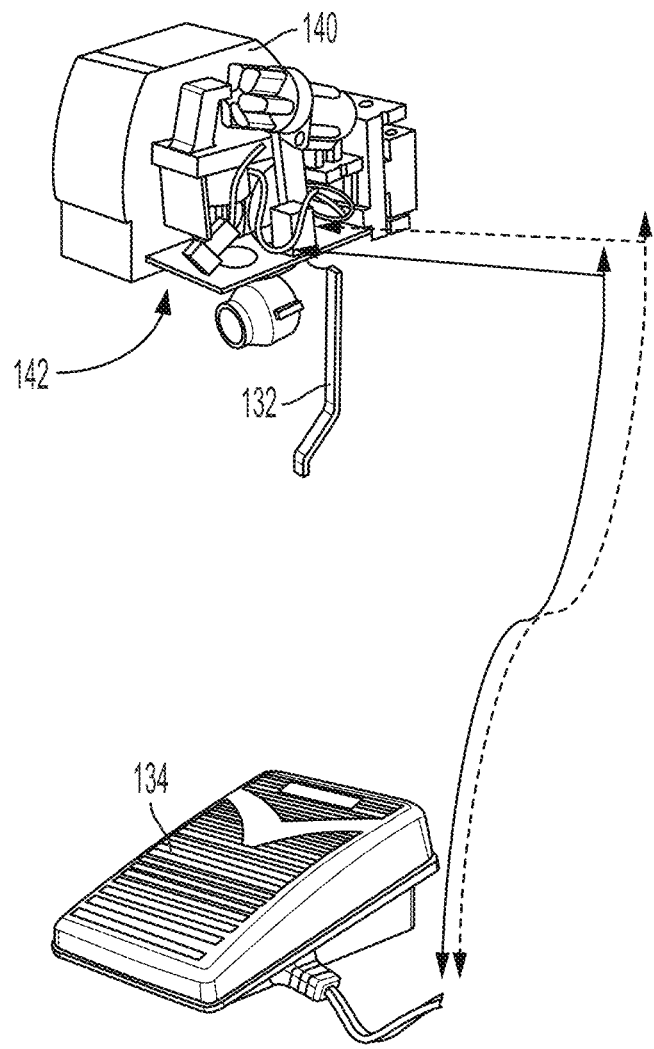
FIG. 2 is an exploded view of an actuator operatively connected to a valve according to embodiments.

With reference to FIG. 2, in some embodiments, item 250 can be dispensed through a valve 140. Housing 110 can support one or more one-way, normally closed valves 140. In some embodiments, each valve 140 can be axially aligned with a specific nozzle 130. Valve 140 include a valve actuator 142 (e.g., a flexible member) to move valve 140 from a closed position to an open position when valve 140 is actuated. In the open position, valve 140 can allow item 250 to pass through a channel in valve 140. Item 250 can then exit nozzle 130 and dispense into container 350.

Valve 140 can be operatively connected to lever actuator 132 such that valve 140 can be actuated when lever actuator 132 is actuated. In some embodiments, valve 140 can also be operatively connected to pedal actuator 134 such that valve 140 can be actuated when pedal actuator 134 is actuated. Accordingly, a user can actuate a specific lever actuator 132 and/or pedal actuator 134 to actuate the valve 140 that is operatively connected. With valve 140 actuated, a particular item 250 can be dispensed from the nozzle 130 axially aligned with valve 140.

Figure 3:
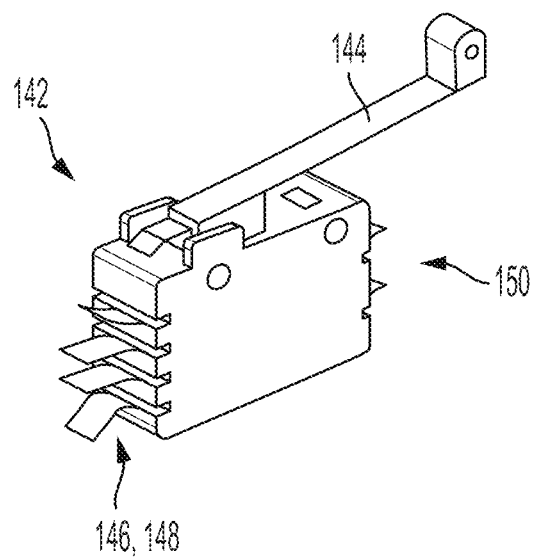
FIG. 3 is a perspective view of a valve actuator according to embodiments.

With reference to FIG. 3, in some embodiments, valve actuator 142 can be distinct from valve 140. For example, valve actuator 142 can be a switch (e.g., a snap action switch) operatively connected to valve 140 such that valve 140 can be actuated when valve actuator 142 is actuated.

In some embodiments, valve actuator 142 can include a mechanical actuator 144. Mechanical actuator 144 can be, for example, an arm or a lever of valve actuator 142. To actuate valve actuator 142, mechanical actuator 144 can move from a first position to a second position such that it is actuated. In the first position, mechanical actuator 144 can be at a first angle from valve actuator 142. Mechanical actuator 144 can be biased toward the first position by a spring that can be contained within valve actuator 142. The second position can be a depressed position against the biasing force such that in the second position, mechanical actuator 144 is at a second angle from valve actuator 142 that is smaller than the first angle. When mechanical actuator 144 is actuated, the spring can move to open or close contacts 146 and 148, which can transfer power (from common 150) to actuate valve 140. Pedal actuator 134 can be operatively connected to valve actuator 142 in this embodiment, such as through mechanical actuator 144.

Figure 4:
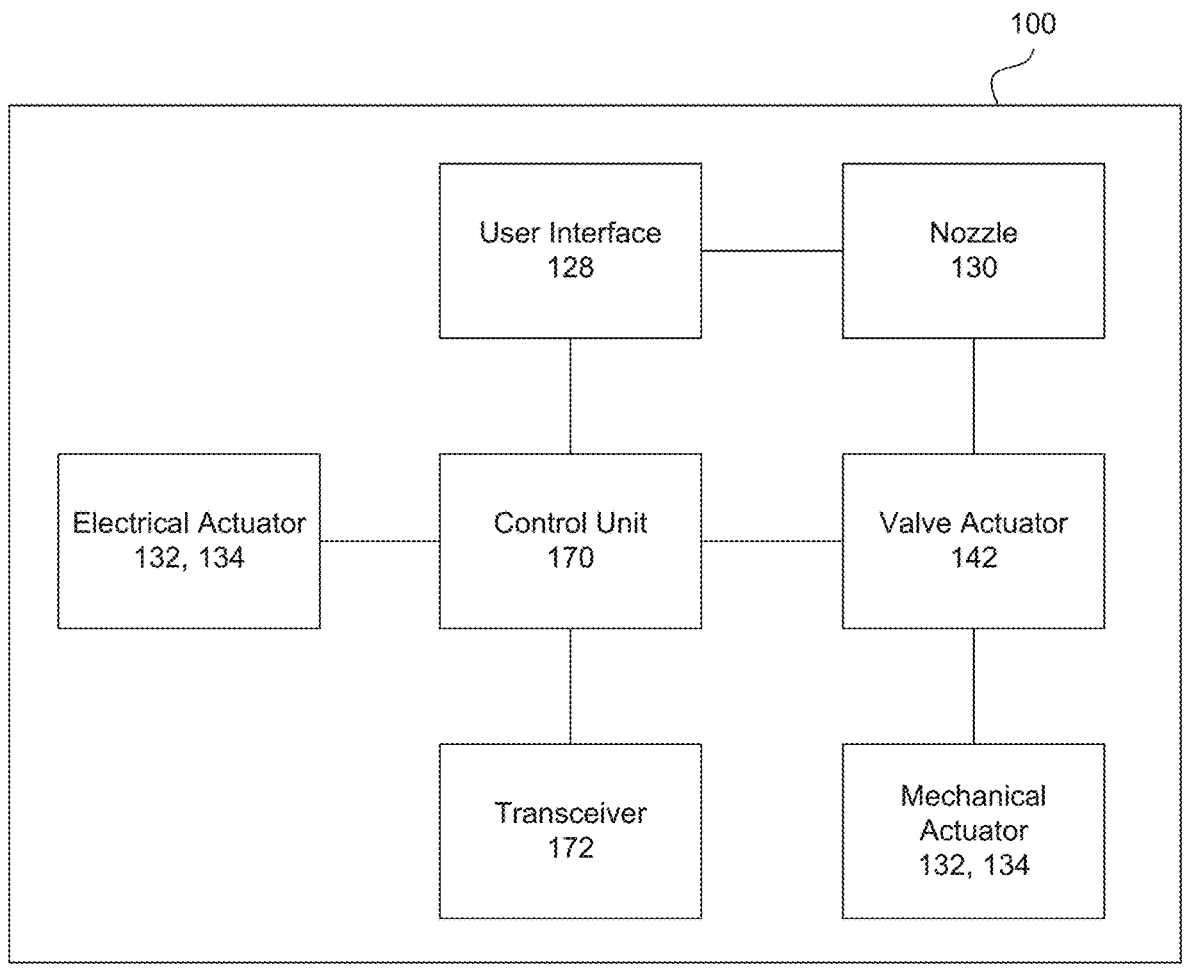
FIG. 4 is a schematic of a dispenser according to embodiments.

In some embodiments, valve actuator 142 can easily retrofit onto existing dispensing systems 500. For example, the addition of valve actuator 142 can provide operative connection between valve 140 and pedal actuator 134 without interfering with existing systems and methods for actuating valve 140. With reference to FIG. 4, in some embodiments, lever actuator 132 and/or pedal actuator 134 can operatively connect to valve actuator 142 electrically. Housing 110 can support a control unit 170 that can receive information on dispensing from user interface 128, such as item 250 to be dispensed. In some embodiments, control unit 170 can receive a signal related to this information via electrical wiring 174 (FIG. 5) from user interface 128. Control unit 170 can also have a communication interface 724 for wireless communication (e.g., Wi-Fi, Bluetooth, a local area network (LAN) connection, etc.). A user can send a signal related to dispensing information wirelessly from a mobile electronic device 950 (not shown) such as a smartphone, smartwatch, laptop, netbook, tablet computer, or the like. In this way, the touchless aspect of some embodiments can be maintained. Control unit 170 can be configured to send a signal to valve actuator 142, of valve 140 or distinct from valve 140, via electrical wiring 174 (FIG. 5) or wirelessly to dispense item 250. In some embodiments, dispenser 100 can include a power source (not shown), e.g., batteries, to power control unit 170 and electrically connected lever actuator 132 and/or pedal actuator 134.

In some embodiments, dispenser 100 can be electrical in that valve 140 can be electrically actuated. In some embodiments, the electrical design can easily retrofit onto existing dispensing systems 500. For example, existing dispensers 100 can include a control unit 170. The addition of pedal actuator 134 and/or electrical connections can provide operative connection between valve 140 and pedal actuator 134 without interfering with existing systems and methods for actuating valve 140. In some embodiments, retrofit can include creating one or more holes (not shown) on body 138 to allow one or more electrical wires 174 to navigate from pedal actuator 134 to valve actuator 142. In some embodiments, container dispenser 300 and/or accessory dispenser 400 can operate as electrical dispenser 100.

Figure 5:
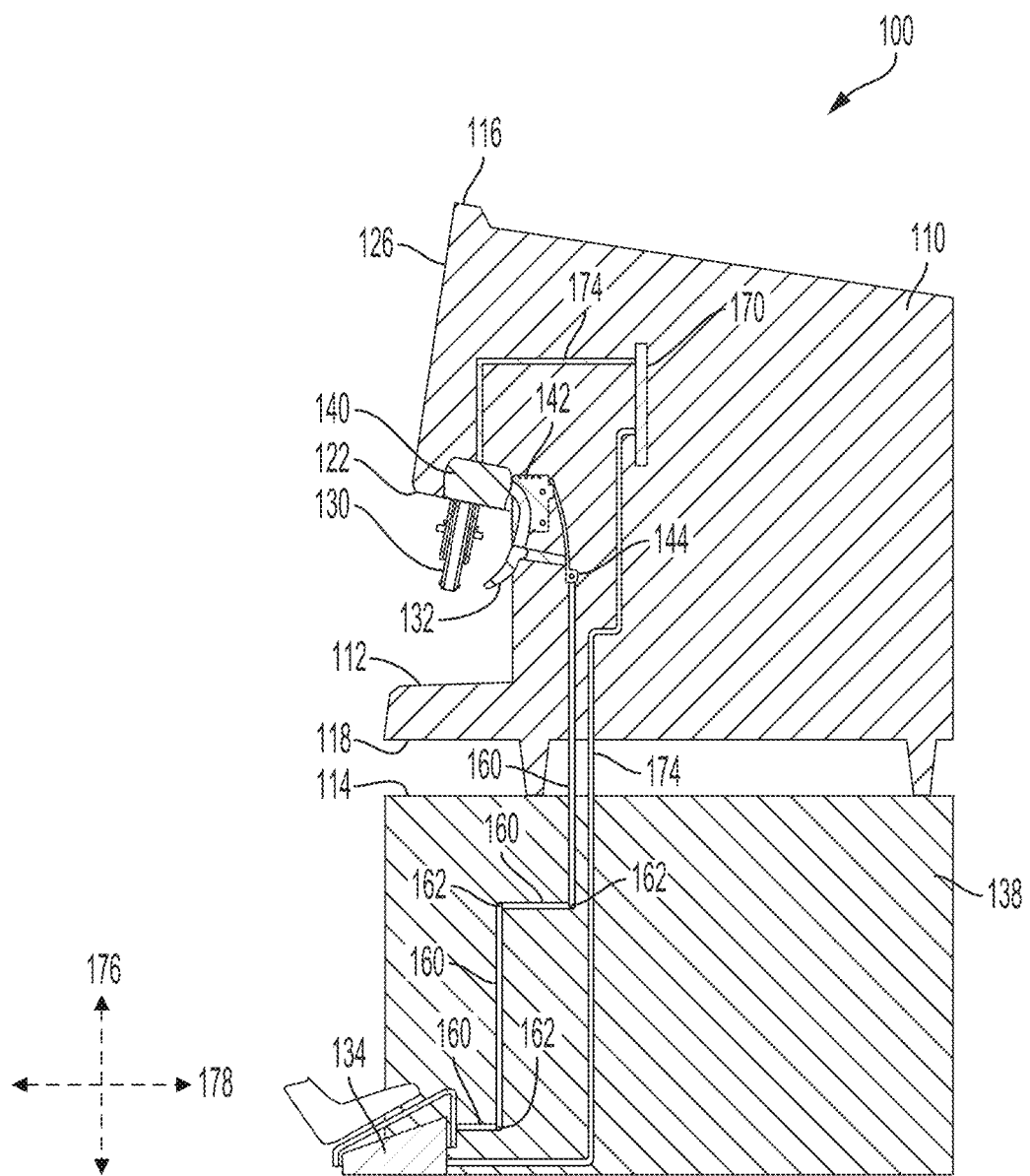
FIG. 5 is a side section view along 5-5 of the dispensing system in FIG. 1.

With reference to FIGS. 4-5, dispenser 100 can be electromechanical in that valve 140 can be electrically and/or mechanically actuated. Lever actuator 132 can operatively connect to valve actuator 142 of valve 140 and/or valve actuator 142 that is distinct from valve 140. Pedal actuator 134 can operatively connect to lever actuator 132, valve actuator 142 of valve 140, and/or valve actuator 142 that is distinct from valve 140. The operative connection can be electrical such that lever actuator 132 and/or pedal actuator 134 are electrical actuators. As shown in FIG. 5, a user can actuate a specific lever actuator 132 and/or pedal actuator 134 to actuate the valve 140 that is operatively connected by electrical wiring 174 to control unit 170. With valve actuator 142 actuated, valve 140 that includes valve actuator 142 or that is operatively connected can be actuated. With valve 140 actuated, a particular item 250 can be dispensed from the nozzle 130 axially aligned with valve 140.

In some embodiments, container 350 can be pushed into lever actuator 132 to actuate lever actuator 132. Pushing container 350 into lever actuator 132 can depress lever actuator 132 such that it can move from a first position to a second position. Lever actuator 132 can be biased to the first position, e.g., by a spring (not shown). In some embodiments, pushing container 350 into lever actuator 132 causes lever actuator 132 to move from a first position to a second position along an axis generally parallel to a longitudinal axis 178. In some embodiments, a foot action on pedal actuator 134 can actuate pedal actuator 134. A user's foot can depress pedal actuator 134 such that it can move from a first position to a second position. Pedal actuator 134 can be biased to the first position, e.g., by a spring (not shown). In some embodiments, actuation by a user's foot on pedal actuator 134 causes pedal actuator 134 to move from a first position to a second position along an axis generally parallel to a longitudinal axis 176.

In some embodiments, lever actuator 132 and/or pedal actuator 134 can operatively connect to mechanical actuator 144 of valve actuator 142 that is distinct from valve 140. The operative connection can be mechanical such that lever actuator 132 and/or pedal actuator 134 are mechanical actuators. When lever actuator 132 and/or pedal actuator 134 is actuated, valve 140 that is operatively connected to valve actuator 142 can be actuated such that item 250 can dispense through nozzle 130. The mechanical operative connection can be a series of linkages 160 and pivot points 162 from lever actuator 132 and/or pedal actuator 134 to valve actuator 142.

In some embodiments, the electro-mechanical design can easily retrofit onto existing dispensing systems 500. For example, the addition of pedal actuator 134, electrical connections, and/or mechanical connections can provide operative connection between valve 140 and pedal actuator 134 without interfering with existing systems and methods for actuating valve 140. In some embodiments, a retrofit can include creating one or more holes (not shown) on body 138 to allow one or more electrical wires 174, mechanical linkages 160 and/or pivot points 162 to navigate from pedal actuator 134 to valve actuator 142. In some embodiments, container dispenser 300 and/or accessory dispenser 400 can operate as electro-mechanical dispenser 100.

Figure 6:
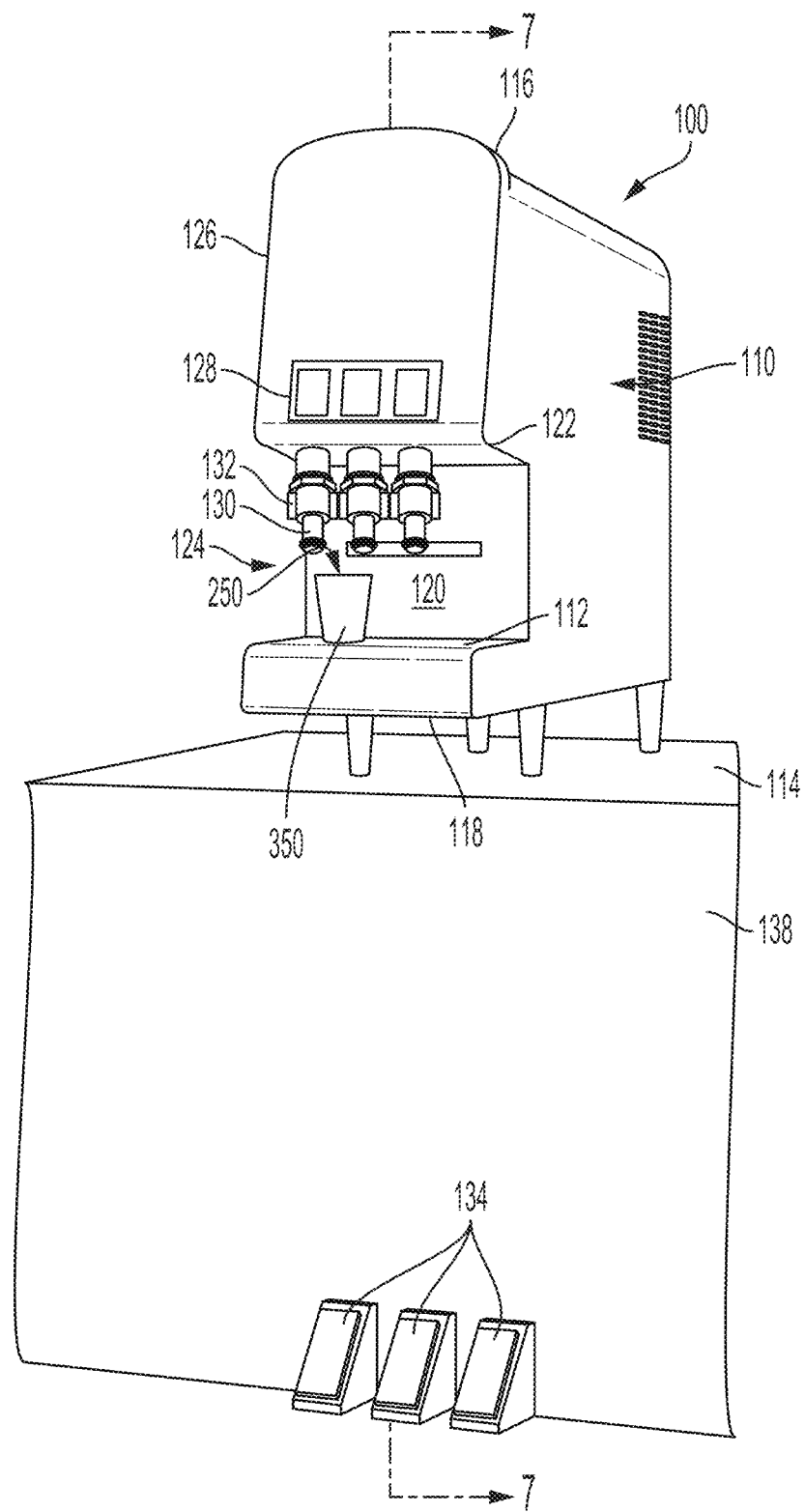
FIG. 6 is a perspective view of a dispenser according to embodiments.
Figure 7:
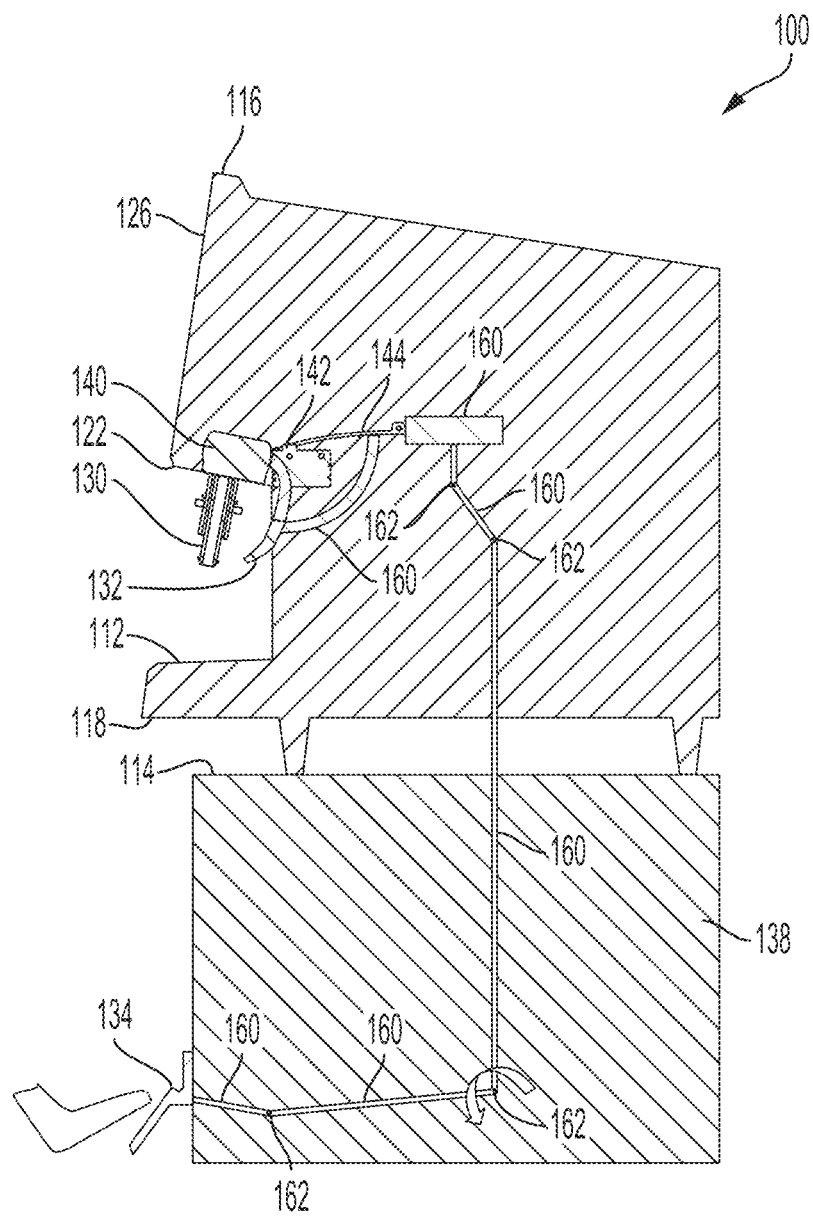
FIG. 7 is a side section view along 7-7 of the dispenser in FIG. 6.

With reference to FIGS. 6-7, in some embodiments, dispenser 100 can be mechanical in that valve 140 can be mechanically actuated. In some embodiments, lever actuator 132 and/or pedal actuator 134 can operatively connect to mechanical actuator 144 of valve actuator 142 that is distinct from valve 140. The operative connection can be mechanical such that lever actuator 132 and/or pedal actuator 134 are mechanical actuators. When lever actuator 132 and/or pedal actuator 134 is actuated, valve 140 can be actuated such that item 250 can dispense through nozzle 130.

The mechanical operative connection can be a series of linkages 160 and pivot points 162 from lever actuator 132 and/or pedal actuator 134 to valve actuator 142. As shown in FIG. 7, lever actuator 132 and/or pedal actuator 134 can be depressed from a first position to a second position. This can cause mechanical linkages 160 operatively connected to the mechanical actuator (lever actuator 132 and/or pedal actuator 134) to move. For example, actuating pedal actuator 134 can cause a first mechanical linkage 160 to move from a first position to a second position. The second position can be a position along a swing path of first mechanical linkage 160. The movement of first mechanical linkage 160 can rotate a first pivot point 162, which can be a rotatable member coupled to first mechanical linkage 160. The rotation of first pivot point 162 about an axis can cause movement of a second mechanical linkage 160 that is coupled to pivot point 162. The second mechanical linkage can move from a first position to a second position. The second position can be a position along a swing path of second mechanical linkage 160. In some embodiments, lever actuator 132 can operatively connect to mechanical actuator 144 of valve actuator 142 with a series of mechanical linkages 160 and pivot points 162 as well.

In some embodiments, the mechanical design can easily retrofit onto existing dispensing systems 500. For example, the addition of pedal actuator 134 and/or mechanical connections can provide operative connection between valve 140 and pedal actuator 134 without interfering with existing systems and methods for actuating valve 140. In some embodiments, a retrofit can include creating one or more holes (not shown) on body 138 to allow one or more mechanical linkages 160 and/or pivot points 162 to navigate from pedal actuator 134 to valve actuator 142.

Figure 8:
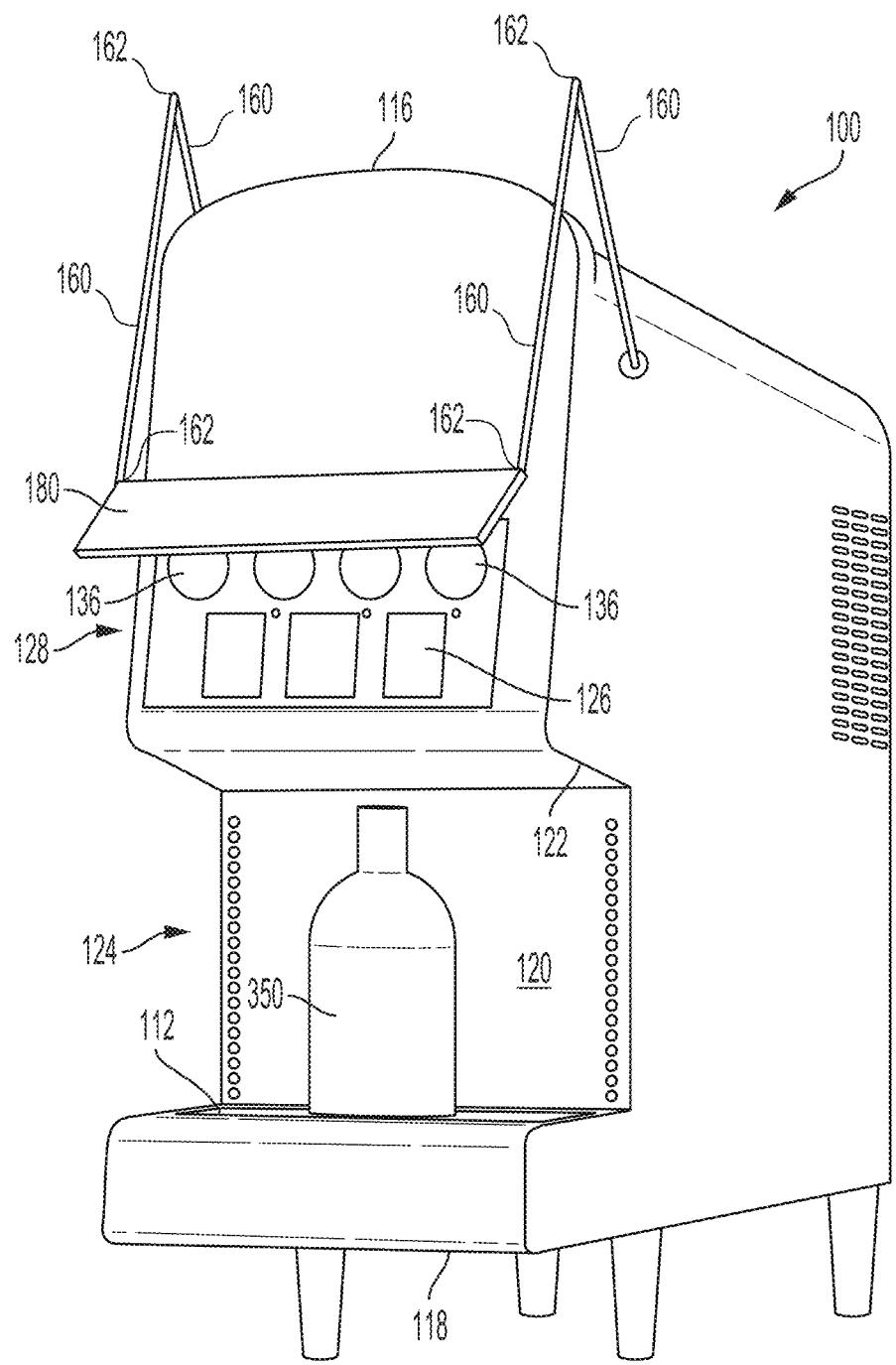
FIG. 8 is a perspective view of a dispenser according to embodiments.

With reference to FIG. 8, in some embodiments, dispenser 100 can be actuated by one or more button actuators 136. In some embodiments, button actuator 136 can operatively connect to valve actuator 142 of valve 140 and/or valve actuator 142 that is distinct from valve 140. The operative connection can be electrical and/or mechanical such that button actuator 136 is an electrical actuator and/or a mechanical actuator. For example, a user can actuate a specific button actuator 136 to actuate the valve 140 that is operatively connected. With valve 140 actuated, a particular item 250 can be dispensed from the nozzle 130 axially aligned with valve 140. Button actuator 136 can be pushed by a user to actuate button actuator 136. Pushing button actuator 136 can depress button actuator 136 such that it can move from a first position to a second position. Button actuator 136 can be biased to the first position, e.g., by a spring (not shown). In some embodiments, pushing button actuator 136 causes button actuator 136 to move from a first position to a second position along an axis generally parallel to longitudinal axis 178 (FIG. 5).

In some embodiments, dispenser 100 actuated by button actuator 136 can be touchless (i.e., no contact). Instead of a user pressing button actuator 136 to actuate button actuator 136, the user can actuate button actuator 136 with a mechanical actuator 180. Mechanical actuator 180 can be located on dispenser 100 and extend over button actuators 136. In some embodiments, mechanical linkages 160 can support mechanical actuator 180 to extend over upper end 116 and down front surface 120 to reach button actuators 136. In some embodiments, dispenser 100 can be mechanical in that valve 140 can be mechanically actuated. As discussed above, dispenser 100 can include one or more pedal actuators 134 operatively connected to one or more valves 140. In some embodiments, one or more pedal actuators 134 can be operatively connected to mechanical actuator 180 instead. The operative connection can be mechanical such that mechanical actuator 180 is a mechanical actuator. When pedal actuator 134 is actuated, mechanical actuator 180 can extend toward a specific button actuator 136 to press and actuate button actuator 136. With button actuator 136 actuated, valve 140 can be actuated such that item 250 can dispense through nozzle 130.

The mechanical operative connection can be a series of linkages 160 and pivot points 162 from pedal actuator 134 to button actuator 136. Pedal actuator 134 can be depressed from a first position to a second position. This can cause mechanical linkages 162 operatively connected to the mechanical actuator (mechanical actuator 180) to move. For example, actuating pedal actuator 134 can cause a first mechanical linkage 160 to move from a first position to a second position. The second position can be a position along a swing path of first mechanical linkage 160. The movement of first mechanical linkage 160 can rotate a first pivot point 162, which can be a rotatable member coupled to first mechanical linkage 160. The rotation of first pivot point 162 about an axis can cause movement of a second mechanical linkage 160 that is coupled to pivot point 162. The second mechanical linkage can move from a first position to a second position. The second position can be a position along a swing path of second mechanical linkage 160.

Figure 9:
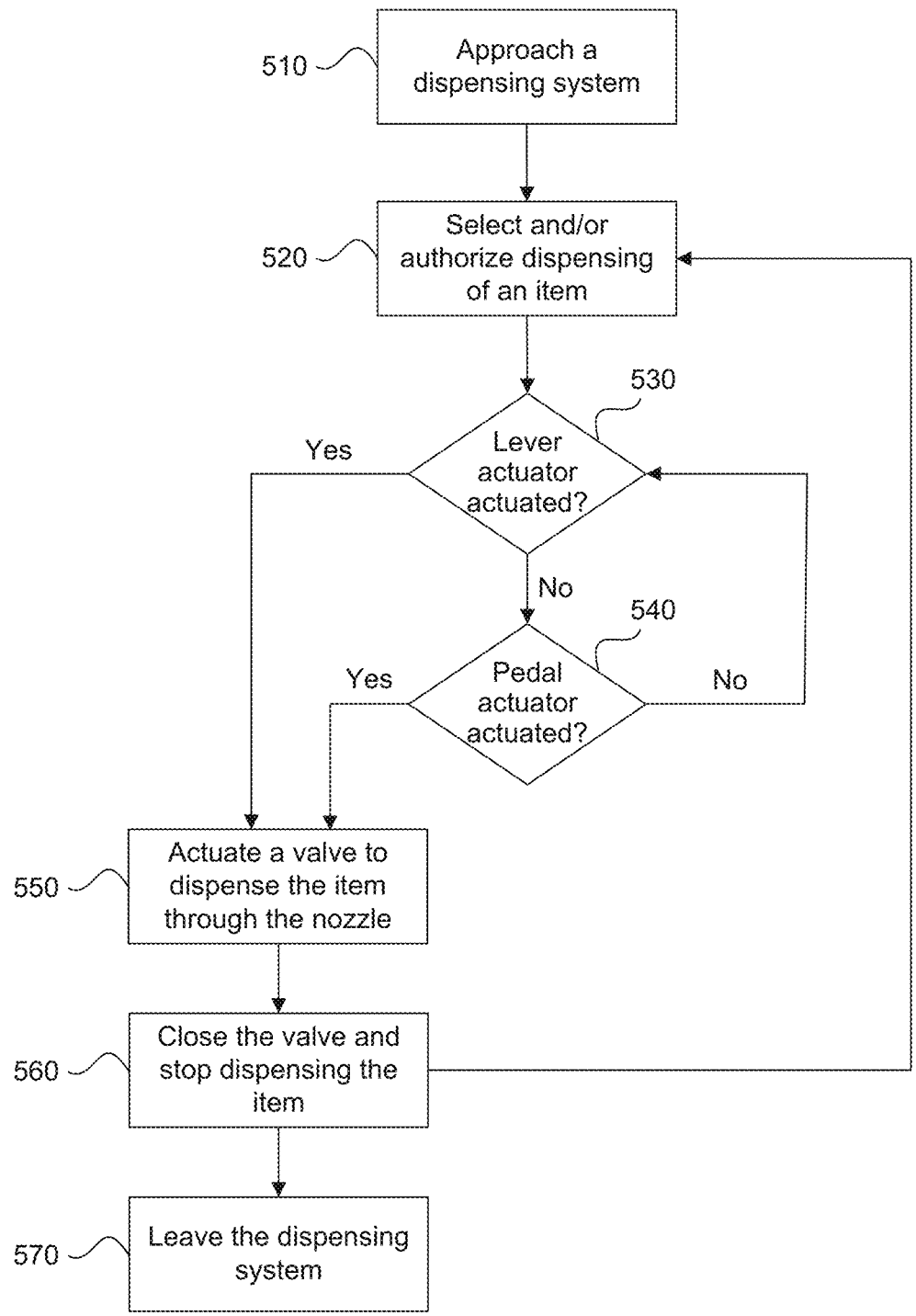
FIG. 9 is a flow chart of the operation of a dispensing system according to embodiments.

Methods of operating the dispensing system disclosed herein are also contemplated and include methods of operation described above. FIG. 9 shows an example block diagram illustrating aspects of a method of operating a dispensing system 500 (e.g., the embodiments shown in FIGS. 1-8).

In some embodiments, dispensing system 500 can include an electro-mechanical dispenser 100 that can dispense item 250. As described above, item 250 can include a food, a beverage, and/or an ingredient for a food and/or a beverage. Dispensing system 500 can be touchless with touchless actuation provided by lever actuator 132 and/or pedal actuator 134.

In some embodiments, at step 510, a user can approach a dispensing system 500. In some embodiments, at step 520, the user can select and/or authorize the dispensing of an item 250. The user can, for example, provide a selection and/or authorization via a signal related to dispensing information wirelessly from a mobile electronic device 950.

In some embodiments, at step 530, the user can actuate a lever actuator 132 of dispenser 100. In some embodiments, the user can push a container 350 into lever actuator 132. Pushing container 350 into lever actuator 132 can depress lever actuator 132 such that it can move from a first position to a second position along an axis generally parallel to longitudinal axis 178 (FIG. 5) and be actuated.

In some embodiments, at step 540, the user can alternatively actuate a pedal actuator 134 of dispenser 100. The user can act on pedal actuator 134 with a foot action. The user's foot can depress pedal actuator 134 such that it can move from a first position to a second position along an axis generally parallel to a longitudinal axis 176 (FIG. 5) and be actuated.

In some embodiments, at step 550, if at least one of lever actuator 132 and pedal actuator 134 is actuated, valve 140, which is operatively connected to lever actuator 132 and pedal actuator 134, can be actuated. Valve 140 can include valve actuator 142. Alternatively, valve 140 can be operatively connected to a valve actuator 142 that is distinct from valve 140. Valve actuator 142 that is part of valve 140 or distinct from valve 140 can be electrically and/or mechanically connected to lever actuator 132 and/or pedal actuator 134. For example, dispenser 100 can include control unit 170. Control unit 170 can be configured to send a signal to valve actuator 142, of valve 140 or distinct from valve 140, via electrical wiring 174 or wirelessly to dispense item 250. The mechanical operative connection can be a series of linkages 160 and pivot points 162 from lever actuator 132 and/or pedal actuator 134 to valve actuator 142. When lever actuator 132 and/or pedal actuator 134 is actuated, valve 140 can be actuated such that item 250 can dispense through nozzle 130.

In some embodiments, at step 550, valve 140 can be actuated while lever actuator 132 and/or pedal actuator 134 is actuated. In some embodiments, dispenser 100 can dispense item 250 up to a predetermined amount while lever actuator 132 and/or pedal actuator 134 are actuated. In some embodiments, at step 550, valve 140 can be actuated for a predetermined period of time and/or while a predetermined amount of item 250 is dispensed. In this embodiment, valve 140 can be actuated after a first actuation of lever actuator 132 and/or pedal actuator 134 such that actuation does not need to be maintained (i.e., the user can release lever actuator 132 and/or pedal actuator 134 after a first actuation).

In some embodiments, at step 560, valve 140 can close and dispenser 100 can stop dispensing item 250. In some embodiments, valve 140 can close and dispenser 100 can stop dispensing item 250 when lever actuator 132 and/or pedal actuator 134 is no longer actuated. In some embodiments, valve 140 can close and dispenser 100 can stop dispensing item 250 when a predetermined period of time is reached or a predetermined amount of item 250 is dispensed.

In some embodiments, at step 570, the user can leave dispensing system 500 or return to step 520 and dispense a second item 250 from dispenser 100.

Figure 10:
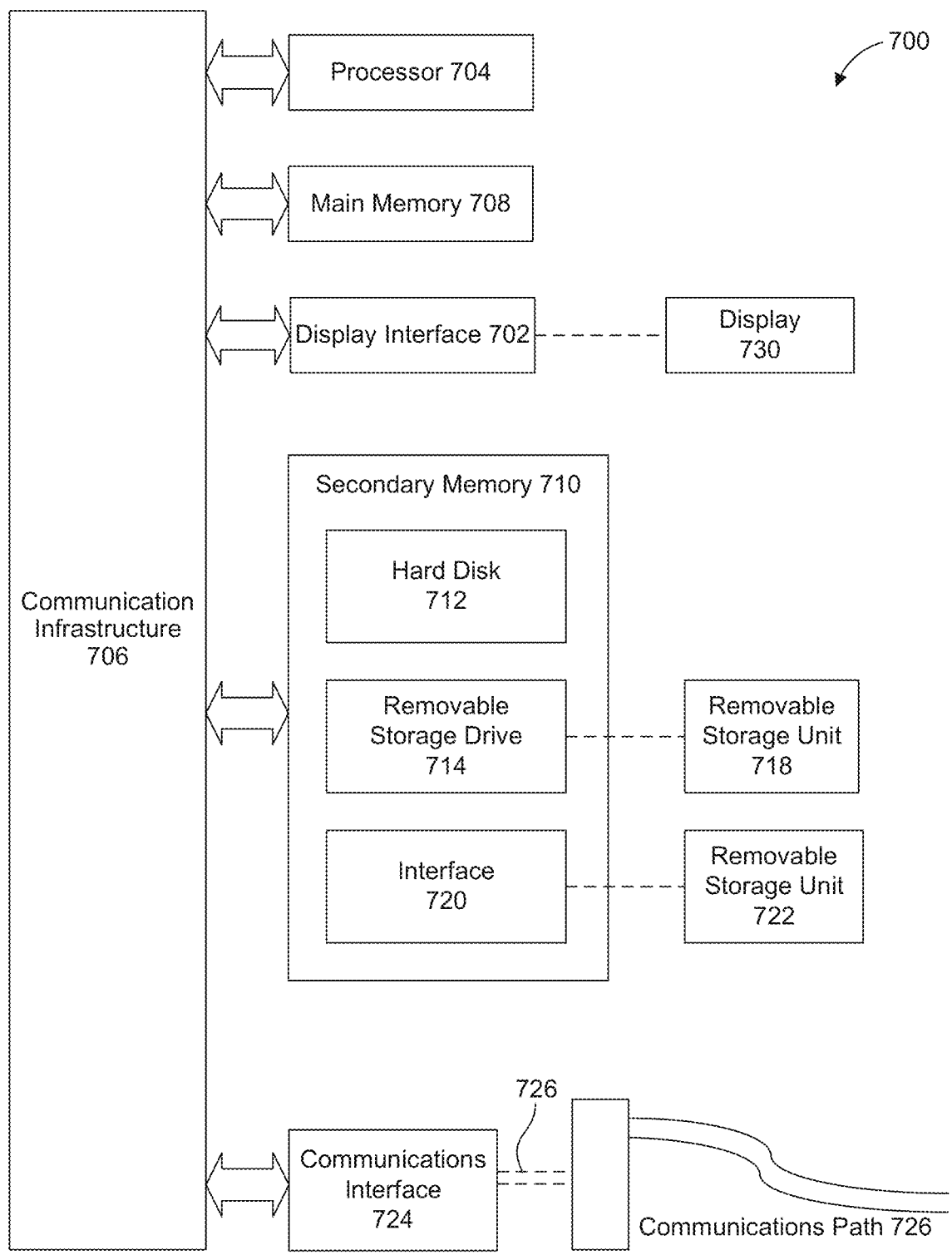
FIG. 10 is a schematic block diagram of an exemplary computer system in which embodiments may be implemented.

FIG. 10 illustrates an exemplary computer system 700 in which embodiments, or portions thereof, may be implemented as computer-readable code. A control unit 170 as discussed herein may be a computer system having all or some of the components of computer system 700 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments may be implemented in terms of this example computer system 700. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, or removable storage drive 714. Removable storage drive 714 may include a floppy disk drive, a magnetic tape drive, an optical disk drive, a flash memory, or the like. The removable storage drive 714 reads from and/or writes to a removable storage unit 718 in a well-known manner. Removable storage unit 718 may include a floppy disk, magnetic tape, optical disk, a universal serial bus (USB) drive, etc. which is read by and written to by removable storage drive 714. As will be appreciated by persons skilled in the relevant art, removable storage unit 718 includes a computer usable storage medium having stored therein computer software and/or data.

Computer system 700 (optionally) includes display 730 (which can include input and output devices such as keyboards, mice, etc.) that forwards graphics, text, and other data from communication infrastructure 706 (or from a frame buffer not shown) for display on display 802.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communication interface 724. Communication interface 724 allows software and data to be transferred between computer system 700 and external devices. Communication interface 724 may include a modem, a network interface (such as an Ethernet card), a communication port, a PCMCIA slot and card, or the like. Software and data transferred via communication interface 724 may be in the form of signals, which may be electronic, electromagnetic, optical, or other signals capable of being received by communication interface 724. These signals may be provided to communication interface 724 via a communication path 726. Communication path 726 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 718 removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communication interface 724. Such computer programs, when executed, enable computer system 700 to implement the embodiments as discussed herein. In particular, the computer programs, when executed, enable processor device 704 to implement the processes of the embodiments discussed here. Accordingly, such computer programs represent controllers of the computer system 700. Where the embodiments are implemented using software, the software may be stored in a computer program product and loaded into computer system 700 using removable storage drive 714, interface 720, and hard disk drive 712, or communication interface 724.

Embodiments of the invention(s) also may be directed to computer program products comprising software stored on any computer useable medium. Such software, when executed in one or more data processing device, causes a data processing device(s) to operate as described herein.

Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A dispenser, comprising:
    a housing;
    a nozzle arranged on the housing for dispensing an item;
    a valve operatively connected to the nozzle and configured to move from a closed position to an open position to dispense the item;
    a mechanical actuator operatively connected to the valve actuator;
    a first actuator operatively connected to the nozzle and the mechanical actuator, the first actuator arranged on the housing below the nozzle, wherein the first actuator is configured to be depressed by a container from a first position to a second position to dispense the item into the container;
    a platform arranged on the housing and located below the first actuator; and
    a second actuator operatively connected to the nozzle and the mechanical actuator, the second actuator arranged on the housing below the platform, wherein the second actuator is depressed from a first position to a second position to dispense the item.

2. The dispenser of claim 1, further comprising an electrical actuation operatively connected to the valve actuator.

3. The dispenser of claim 1, wherein the second actuator is configured to be depressed by a foot action and comprises at least one of a pedal or a button.

4. The dispenser of claim 1, wherein the nozzle dispenses the item while at least one of the first actuator or the second actuator is depressed.

5. The dispenser of claim 1, wherein the nozzle dispenses the item for a predetermined period of time.

6. The dispenser of claim 1, wherein the nozzle dispenses a predetermined amount of the item.

7. The dispenser of claim 1, wherein the nozzle dispenses the item after the item is selected and dispensing is authorized.

8. The dispenser of claim 1, wherein the dispenser is touchless.

9. The dispenser of claim 1, wherein the dispenser is configured to retrofit onto an existing dispenser.

10. A dispensing system, comprising:
    a dispenser comprising a housing;
    a nozzle operatively connected to a valve of the dispenser and arranged on the housing for dispensing an item;
    a valve actuator configured to open the valve for dispensing the item;
    a mechanical actuator operatively connected to the valve actuator;
    a first dispensing actuator operatively connected to the valve actuator and arranged on the housing below the nozzle, the first dispensing actuator comprising a pedal configured to be actuated by a foot action, wherein the first dispensing actuator is depressed from a first position to a second position to dispense the item; and
    a second dispensing actuator operatively connected to the valve actuator and arranged on the housing above the first dispensing actuator,
    wherein the second dispensing actuator comprises at least one of a button or a lever configured to be depressed by a container from a first position to a second position to dispense the item into the container.

11. The dispensing system of claim 10, further comprising:
    a control unit,
    wherein the first dispensing actuator is configured to send an electrical signal to the control unit, and
    wherein the control unit is configured to send an electrical signal to the valve actuator to open the valve.

12. The dispensing system of claim 10, wherein the first dispensing actuator is operatively connected to the mechanical actuator.

13. The dispensing system of claim 10, wherein the first dispensing actuator is biased toward the first position.

14. The dispensing system of claim 10, wherein the second dispensing actuator is operatively connected to the mechanical actuator.

15. The dispensing system of claim 10, further comprising:
    a second dispenser for dispensing an accessory of the item, the accessory comprising at least one of a straw, a lid, or a container sleeve; and
    a third dispensing actuator operatively connected to the second dispenser comprising a pedal configured to be actuated by a foot action, wherein the second dispensing actuator is depressed from a first position to a second position to dispense the accessory.

16. A method of dispensing an item with a dispenser, comprising:
    providing a first actuator comprising a pedal, the first actuator configured to be actuated by a foot action and to be depressed from a first position to a second position;
    providing a second actuator configured to be depressed by a container from a first position to a second position to dispense the item into the container;
    opening a valve operatively connected to a nozzle of the dispenser in response to actuating the first actuator or the second actuator;

operatively connecting the first actuator and the second actuator with a mechanical actuator to open the valve; and dispensing the item by the nozzle.

17. The method of claim 16, further comprising:

locating the second actuator above the first actuator, the second actuator configured to be depressed from a first position to a second position.

18. The method of claim 17, wherein a force to depress the first actuator is lower than a force to depress the second actuator.

19. The method of claim 16, further comprising:

authorizing dispensing by confirming at least one of identity and payment after an item is selected for dispensing.

20. The method of claim 16, wherein the second actuator comprises a lever.

\* \* \* \* \*